United States Patent [19]

Reichert

[11] Patent Number: 5,846,088
[45] Date of Patent: Dec. 8, 1998

[54] TEACHING APPPARATUS FOR MAGNETIC TORQUE EXPERIMENTS

[76] Inventor: Jonathan F. Reichert, 45 Penhurst Park, Buffalo, N.Y. 14222

[21] Appl. No.: 778,839

[22] Filed: Jan. 6, 1997

[51] Int. Cl.⁶ ................................................. G09B 23/18
[52] U.S. Cl. ............................................................ 434/301
[58] Field of Search .................................... 434/301, 300

[56] References Cited

U.S. PATENT DOCUMENTS 1,182,636   5/1916   Burns ....................................... 434/301

FOREIGN PATENT DOCUMENTS

2697656   5/1994   France ................................... 434/301
1781693  12/1992   U.S.S.R. ................................ 434/301

Primary Examiner—Jeffrey A. Smith
Attorney, Agent, or Firm—Hodgson, Russ, Andrews, Woods & Goodyear LLP

[57] ABSTRACT

Teaching apparatus for demonstrating the effect of a magnetic field on a magnetic moment wherein a pair of electromagnet coils produce a uniform and constant magnetic field in a direction substantially perpendicular to the plane of a surface on which the apparatus is supported, i.e. typically in a vertical direction. In one aspect a spherical insulator with a magnetic dipole imbedded at its center is positioned in the magnetic field and supported on an ultra-low friction air bearing for demonstrating the interaction of magnetic fields with magnetic moments. In another aspect, a magnetic dipole is located in the magnetic field and is suspended by a spring scale to allow direct measurement of translational forces in the presence of a magnetic field gradient. In another aspect, a rotatable magnet produces a uniform magnetic field in a direction substantially perpendicular to the first-mentioned field for demonstrating nutation when the spherical part is spinned and the magnet is rotated.

23 Claims, 10 Drawing Sheets

TEACHING APPPARATUS FOR MAGNETIC TORQUE EXPERIMENTS

BACKGROUND OF THE INVENTION

This invention relates to the art of teaching apparatus, and more particularly to a new and improved teaching apparatus for demonstrating the effect of a magnetic field on a magnetic moment.

The principal area of use of the present invention is demonstrating and studying the effects of a magnetic field on a small permanent magnet that can be treated as if it were a magnetic dipole, although the principles of the present invention can be variously applied. There is need for an improved teaching device for high school, college and university students of the physical sciences and engineering who are studying electricity and magnetism and magnetic resonance. Such teaching device should be relatively simple in construction, economical to manufacture, and effective and straight-forward in operation.

It would, therefore, be highly desirable to provide such teaching apparatus for demonstrating the effect of magnetic torque in both static and dynamic systems, for demonstrating small amplitude harmonic oscillation, precession and nutation in systems with angular momentum, for demonstrating a classical model of nuclear magnetic resonance, and for demonstrating zero net force in a uniform magnetic field and a net translational force in a magnetic field gradient.

SUMMARY OF THE INVENTION

The present invention provides teaching apparatus for demonstrating the effect of a magnetic field on a magnetic moment wherein a pair of electromagnet coils produce a uniform and constant magnetic field in a direction substantially perpendicular to the plane of a surface on which the apparatus is supported, i.e. typically in a vertical direction. In one aspect a spherical insulator with a magnetic dipole imbedded at its center is positioned in the uniform magnetic field and supported on an ultra-low friction air bearing for demonstrating the interaction of magnetic fields with magnetic moments. In another aspect, a magnetic dipole is located in the magnetic field and is suspended by a spring scale to allow direct measurement of translational forces in the presence of a magnetic field gradient. In another aspect, a rotatable magnet produces a uniform magnetic field in a direction substantially perpendicular to the first-mentioned field for demonstrating nutation when the spherical part is spinned and the rotatable magnet is rotating.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

Figure 1:
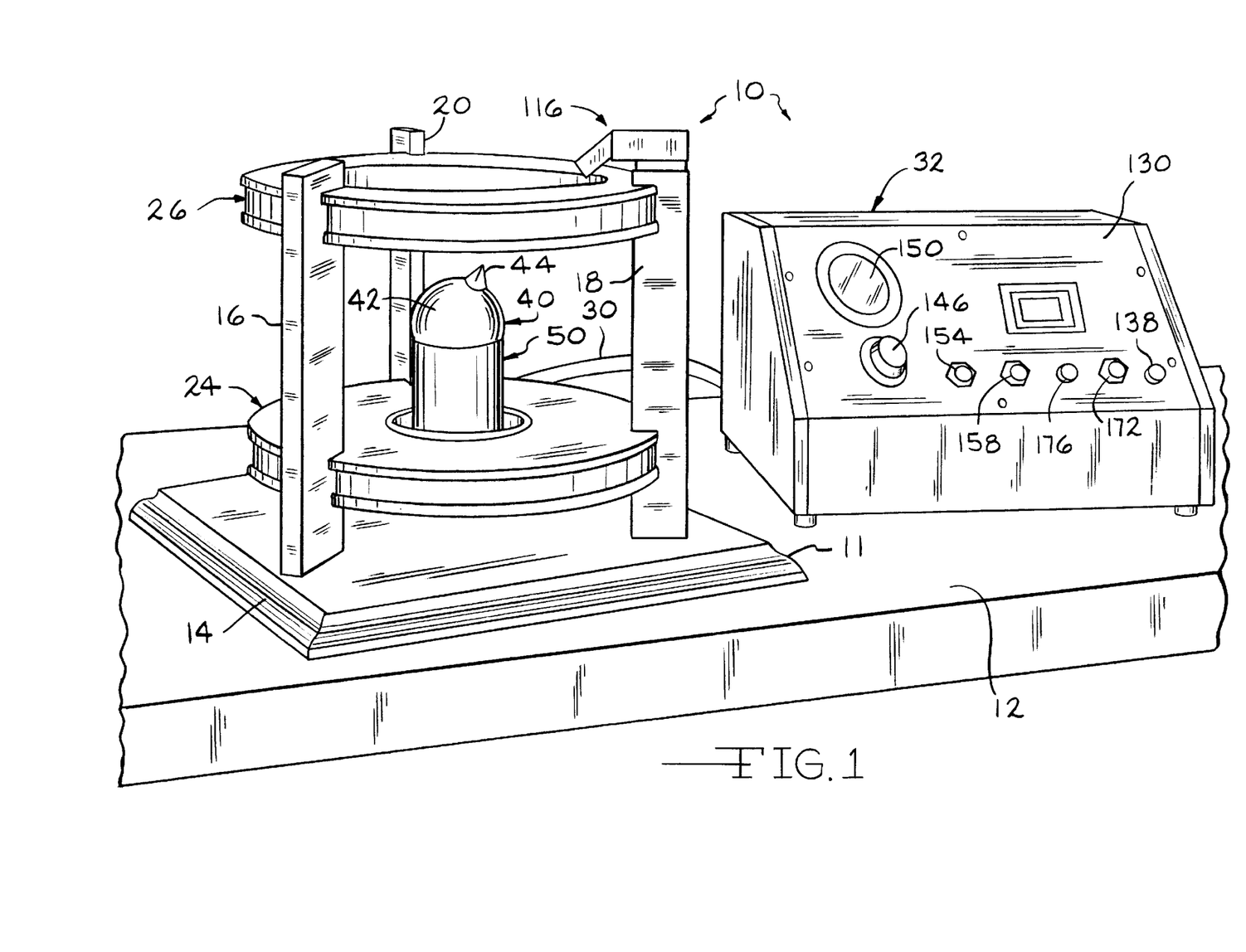
FIG. 1 is a perspective view of the teaching apparatus according to the present invention.

FIG. 1 shows the teaching apparatus according to the present invention generally designated 10 as it would appear during use supported on the top surface 12 of a table, desk, laboratory counter or the like. The apparatus includes a supporting frame comprising a plate-like base 14 and upstanding supports 16, 18 and 20 which hold a pair of spaced-apart electromagnetic coil assemblies 24 and 26 which are disposed in planes substantially parallel to the plane of surface 12. Each coil assembly 24 and 26, as will be described in detail presently, includes a winding on an annular coil form, and the windings are connected via leads in a cable 30 leading to the power supply and control portion 32 of apparatus 10 for controlled energization of the windings. The electromagnetic coil assemblies 24 and 26 provide a uniform electromagnetic field in a direction substantially perpendicular to the planes in which they are disposed and to the plane of supporting surface 12, i.e. in a vertical direction as viewed in FIG. 1.

In the aspect of the invention illustrated in FIG. 1, there is included permanent magnet means 40 for providing a magnetic moment and in the form of a spherical insulator 42 with a permanent magnet (not shown in FIG. 1) embedded at the center thereof. An indicator 44 extends out from the surface of insulator 42 to facilitate observation of movement thereof as will be described in detail presently. The permanent magnet means 40 is located centrally of coil assemblies 24 and 26, i.e. along the common longitudinal axis thereof, and is located in the electromagnetic field. The permanent magnet means 40 is movably supported by means generally designated 50 in FIG. 1 so that a change in a parameter of the electromagnetic field causes a movement in the permanent magnet means 40 thereby illustrating a magnetic phenomenon as will be described. The supporting means 50 preferably comprises gas-operated bearing and supporting means, i.e. an air bearing, for providing an ultra-low friction support for spherical insulator 42 thereby imposing substantially no torque on spherical insulator 42. The air bearing 50, which in the present illustration is supported by the coil form of coil assembly 26, will be described in detail presently.

Figure 2:
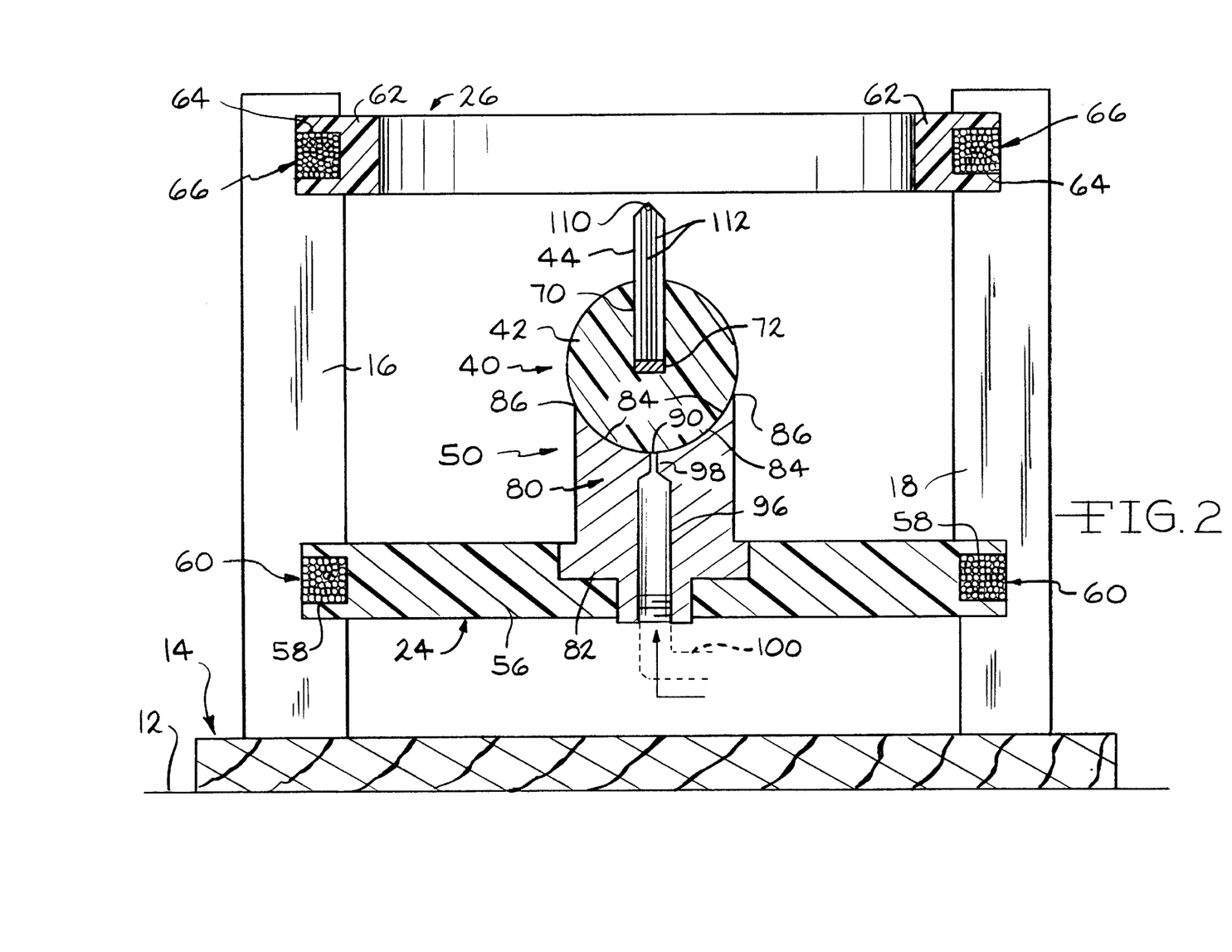
FIG. 2 is a side elevational view, with parts removed and partly in section, of the apparatus of FIG. 1.

Referring now to FIG. 2, coil assembly 24 comprises a coil form 56 of non-magnetic material, for example Formica material, which is in the overall shape of a disk provided with an annular groove or recess 58 in the periphery thereof which receives a winding 60. Coil assembly 26 comprises a coil form 62 of non-magnetic material, for example Formica material, which is in the shape of a ring provided with an annular groove or recess 64 in the periphery thereof which receives a winding 66. By way of example, in an illustrative teaching apparatus, each winding 60 and 66 comprises 200 turns of #20 magnet wire in an average diameter of 8.5 inches. Each annular recess 58 and 64 has an outer diameter of 9.50 inches, an inner diameter of 7.90 inches and a width of 0.666 inches. Base 14 can be of wood or plastic and the posts 16, 18 and 20 can be of brass. Coilforms 56 and 62 are received in corresponding notches or recesses in the posts 16, 18 and 20 and can be secured therein by set screws (not shown) extending from the corresponding ends of the posts to the recesses. Posts 16, 18 and 20 can be secured to base 14 by screws (not shown) extending through base 14 into the lower ends of the posts as viewed in FIG. 2.

Spherical insulator 42 can be of plastic material, and a high quality billiard ball having an outer diameter of 2⅛ inches has been found to provide satisfactory results due to the highly durable and nearly perfectly spherical outer surface thereof. As shown in FIG. 2, a bore or passage 70 is provided along a radius of sphere 42 to the center thereof where a permanent magnet 72 is placed so as to be located at the center of the sphere. In the apparatus shown, magnet 72 is in the form of a uniformly magnetized disk located so that the center of the disk coincides with the center of the sphere 42. In use of the apparatus 10, various spheres 42 having different effective magnetic movements are employed. This is accomplished by having magnets 72 of various high energy magnetic materials of different total magnetic energy, for example neodymium iron boron. By way of example, in an illustrative apparatus, each sphere 42 is a high quality 2⅛ inch OD billiard ball with passage 70 having a ⅜ inch diameter and with disk magnet 72 having a ⅜ inch outer diameter and ¼ inch thickness. As shown in FIG. 2, the indicator 44, which will be described in detail presently, is fitted in passage 70 and serves to retain magnet 72 in place.

Figure 3:
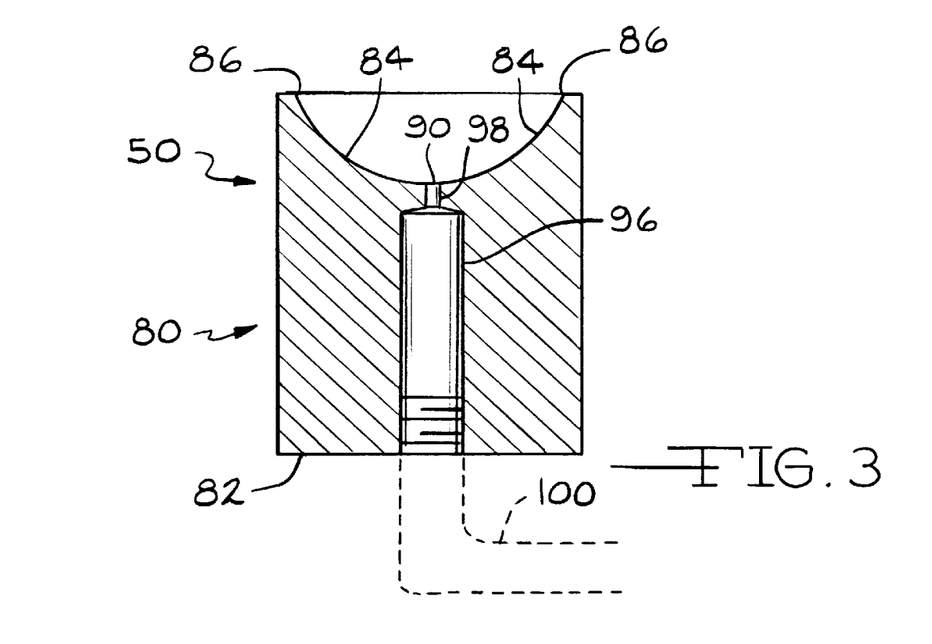
FIG. 3 is a longitudinal sectional view of the air bearing shown in Fig.2.
Figure 4:
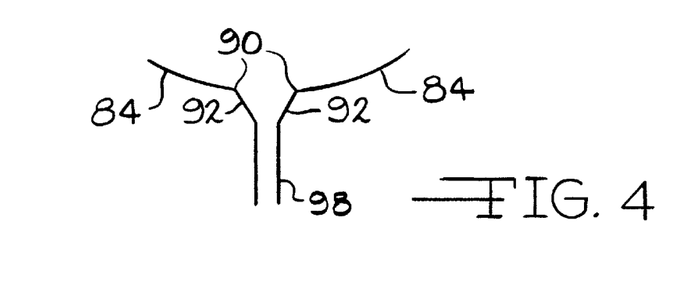
FIG. 4 is an exploded view of a portion of the air bearing shown in FIG. 3.

The supporting means 50, which is shown also and in further detail in FIGS. 3 and 4, includes a generally cylindrical body 80 which is supported at one end 82 by coil form 56 so as to be in an upright position with the longitudinal axis thereof being substantially perpendicular to the plane of coil form 56. Alternatively, body 80 could be of greater overall axial length and extend through coil form 56 and be supported at the one end on base 14. Body 80 is provided at the other end with a surface 84 shaped to support the spherical body 42 in an ultra-low friction manner so as to impose substantially no torque or spherical insulator 42 for a purpose which will be described. Surface 84 is a solid continuous concave surface having a degree of curvature substantially equal to the degree of curvature of the outer surface of spherical insulator 42. Surface 84 is semispherical defining a substantially circular peripheral edge 86.

The supporting means 50 further comprises means for defining an opening 90 in surface 84 and means for supplying gas under pressure, i.e. compressed air, to opening 90 so that gas flows over and along surface 84 to support the spherical insulator 42. Opening 90 is circular in shape and located on surface 84 equidistant from the circular peripheral edge 86 thereof. As shown in the exploded view of FIG. 4, an annular transition surface 92 is provided leading to the junction between opening 90 and surface 84 to facilitate uniform flow of gas over and along the surface 84 to enhance the ultra-low frictional support for sphere 42. A longitudinal bore or passage 96 is provided in body 80 extending from end 82 toward opening 90 and includes a necked-down section 98 in communication with opening 90. A hose or conduit 100 places passage 96 in communication with a source of gas under pressure, i.e. compressed air, which can be located in the power supply and control portion 32 of the apparatus or externally if desired.

By way of example, in an illustrative apparatus, body 80 of supporting means 50 is machined from 2¼ inch cylindrical brass stock where the overall axial length of body 80 viewed in FIG. 3 is 2.52 inch, the axial length of passage 96 is 1.75 inch, the diameter of passage 96 is ⁷⁄₁₆ inch, the diameter of section 98 is 0.062 inch, the diameter of opening 90 is 0.081 inch and the angle of surface 92 is 82 degrees with respect to a plane containing opening 90. Surface 84 is defined by a radius of 1.0625 inch from a point on the longitudinal axis of body 80 a distance 2.950 inches from end surface 82 as viewed in FIG. 3. The source of compressed air is an aquarium pump commercially available from Perfecto Manufacturing of Nobleville, Ind. under model #500 which provides an estimated pressure of 24 inches of water. This is sufficient pressure for experiments conducted at or near sea level. Larger pumps, providing higher pressure and flow, may be necessary at higher elevations.

Figure 5:
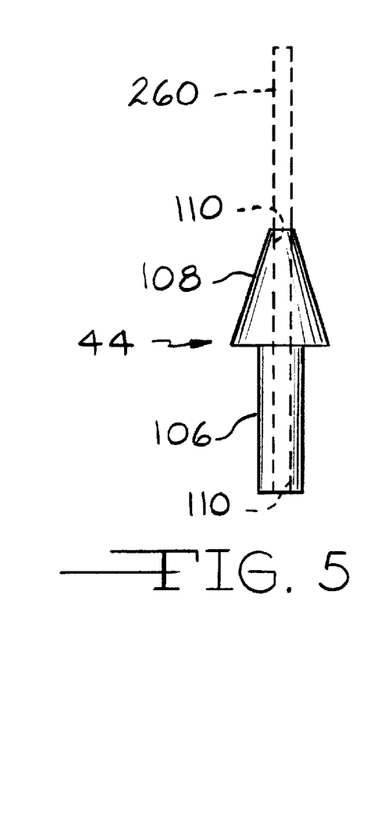
FIG. 5 is an enlarged elevational view of the indicator carried by the spherical component in the apparatus shown in FIG. 2.

Indicator 44 is of non-magnetic and electrically insulating material and can have various forms and shapes. As shown in FIG. 5, indicator 44 can have a cylindinal body portion 106 adapted to be received in passage 70 of sphere 42 and a substantially conical shaped pointer section 108 extending from portion 106. Indicator 44 is provided with a central longitudinal bore or passage 110 to receive a rod 260 to which weights can be attached during certain experiments and demonstrations which will be described in detail presently. As shown in FIG. 2, indicator 44 is provided with stripes 112 or other visible indicia on the outer surface thereof for interaction with pulsed light from a strobe lamp during certain experiments and demonstrations which will be described in detail presently. By way of example, in an illustrative teaching apparatus, indicator 44 can be of wood, plastic or phenolic material and have an overall length of 1.35 inch, body portion can have an outer diameter of 0.375 inch, pointer section can have an axial length of 0.3 inch and bore 110 can have a diameter of ⅛ inch.

When in use the ball 42 is statically balanced with the magnetic material 72 inside by the plastic "arrow" indicator 44 which is inserted into the passage 70 and which serves several purposes. Indicator 44 shows the direction of the magnetic moment, supports the calibrated lever arm for static torque measurements, allows the operator to spin the ball 42, thus giving it angular momentum, shows the axis of the angular momentum, and its indica or pattern is used to determine the rotational speed with a stroboscope as will be described.

Figure 6:
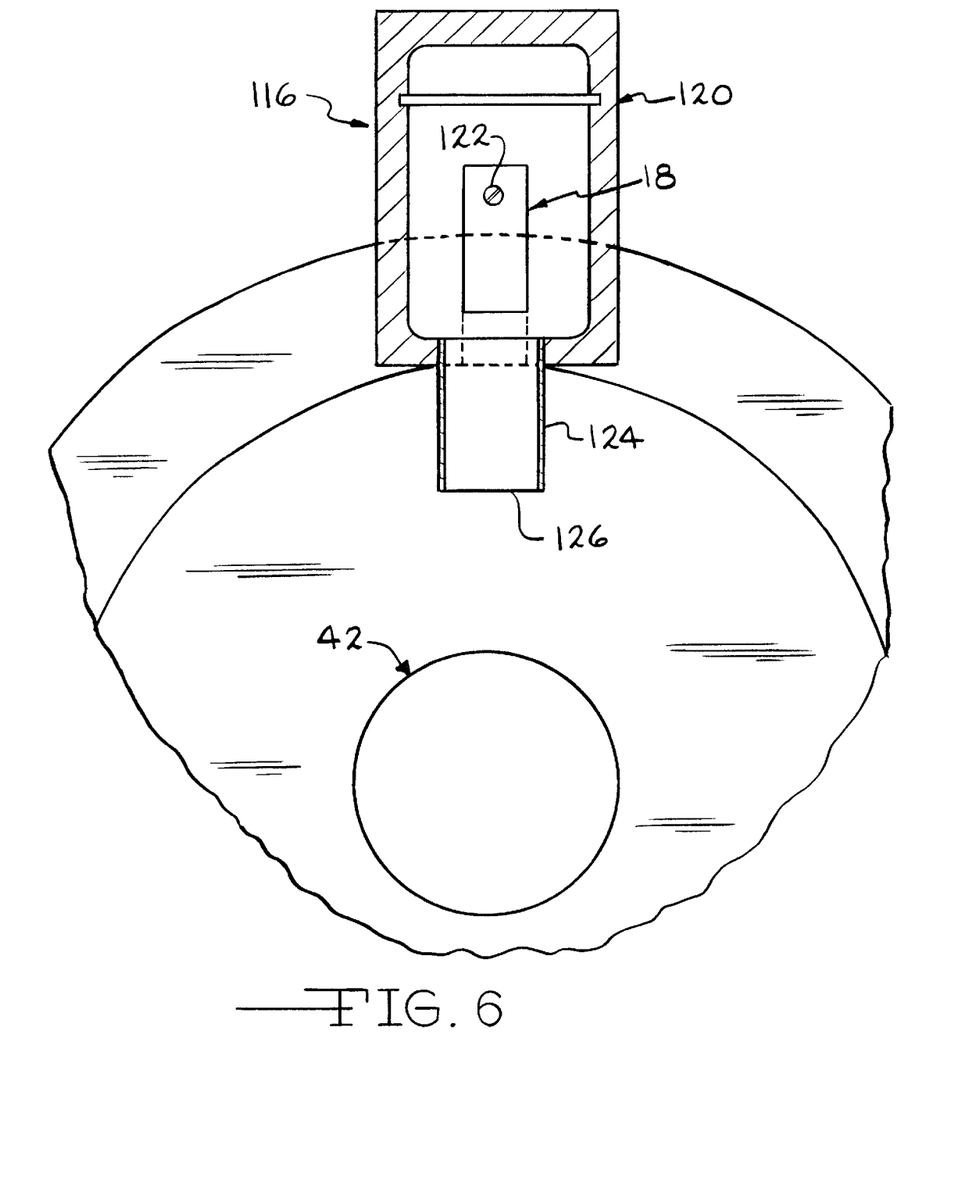
FIG. 6 is an enlarged, fragmentary top plan view of the apparatus of FIGS. 1 and 2 showing the strobe lamp housing.
Figure 7:
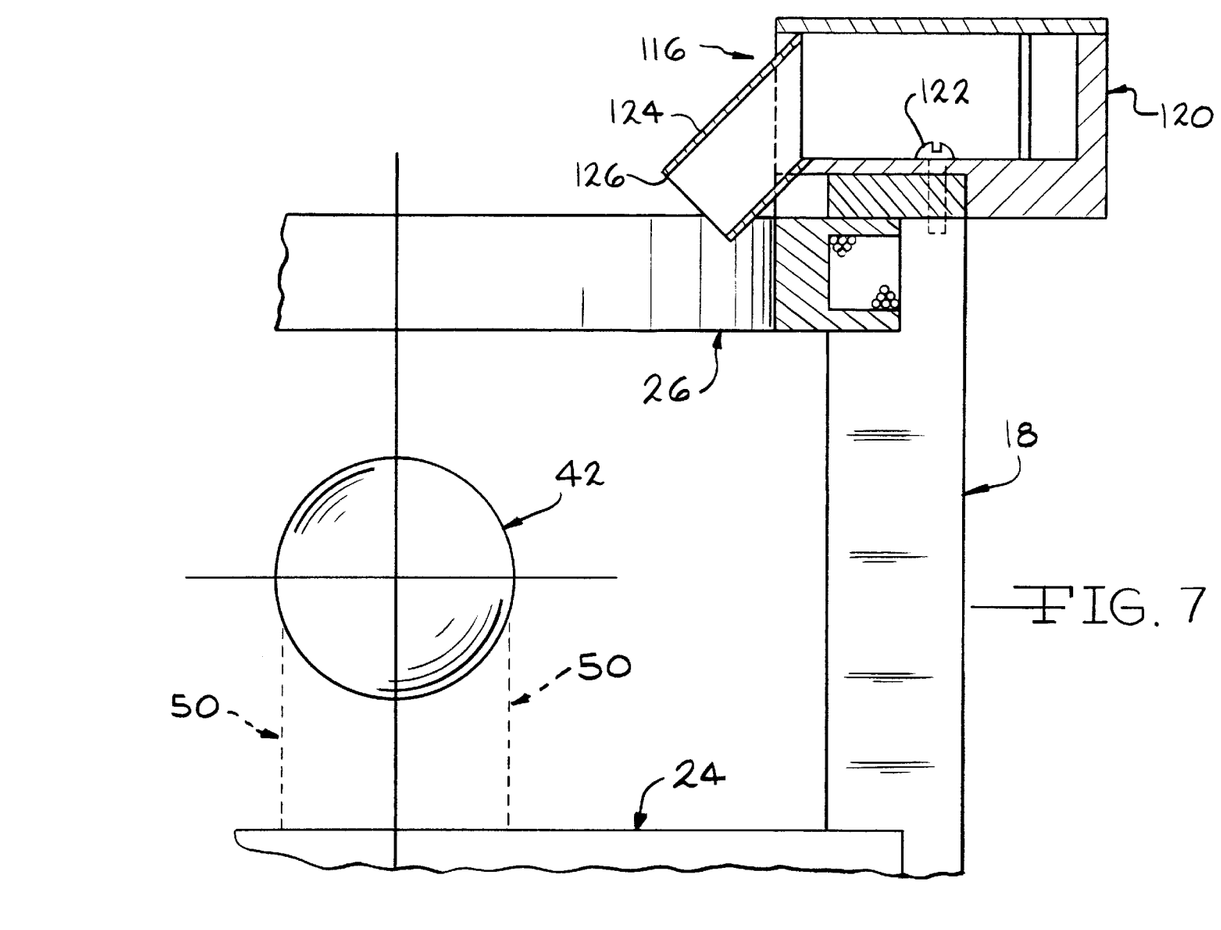
FIG. 7 is an enlarged, fragmentary side elevational view of the apparatus of FIGS. 1 and 2 showing the strobe lamp housing of FIG. 6.

The teaching apparatus 10 of the present invention can include strobe lamp means generally designated 116 in FIGS. 1 and 2 which is carried by the supporting frame of apparatus 10 and which illuminates indicator 44 with pulses of light during movement of permanent magnet means 40, such as rotation of sphere 42, to investigate various motion phenomenon associated with the moving magnet means 40, such as rotational motion of sphere 42. In the apparatus shown, the strobe lamp is contained within a housing 120 mounted on the top of one of the posts, for example post 18, by an insulating screw or similar non-conducting fastener 122 as shown in FIGS. 6 and 7, and is provided with a cylindrical extension 124 defining a focusing aperture 126 for directing the beam of strobe light pulses toward sphere 42 so as to interact with indicator 44 during movement of sphere 42 in a manner which will be described. By way of example, in an illustrative apparatus, the strobe lamp produces a calibrated light flash in intervals which can be varied from 1.0 to 0.01 second and can include an electronic counter to indicate the time interval for a given setting of the strobe lamp. The longitudinal axis of cylindrical extension 124 is disposed at an angle of about 45 degrees with respect to the common longitudinal axis of windings 60 and 66.

Figure 8:
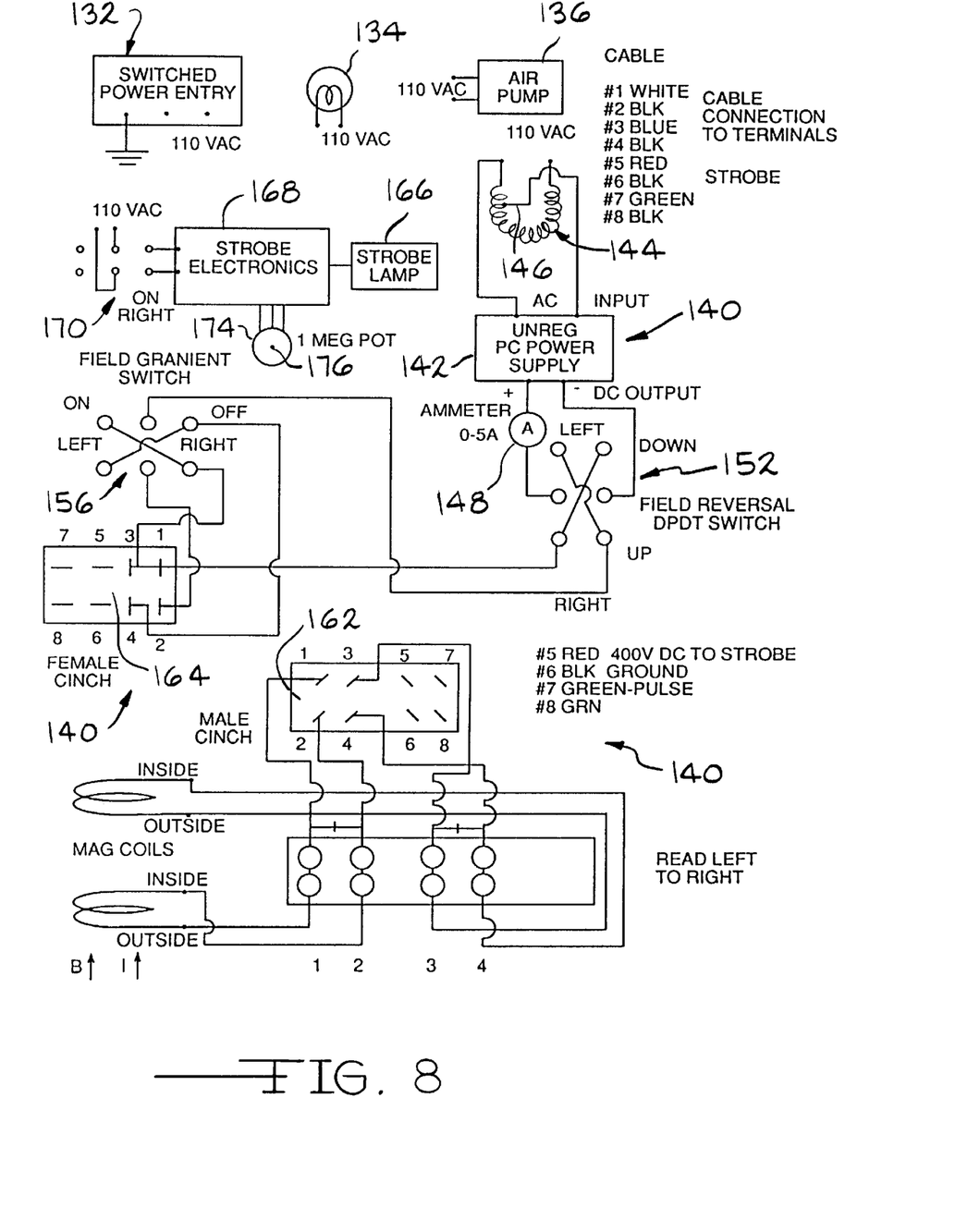
FIG. 8 is a schematic diagram of the power supply circuit and connections in the apparatus shown in FIG. 1.

The power supply and control portion 32 of the teaching apparatus 10 of the present invention is illustrated by the schematic diagram of FIG. 8 wherein components thereof are contained within the housing 130 shown in FIG. 1. The arrangement is powered by standard line voltage under control of a main on-off switch 132 which can be at a convenient location on housing 130. A power-on indicator lamp 134 can be connected to switch 132. A control 136 for the air pump (not shown) which supplies compressed air to hose 100 is operated by an on-off switch 138 shown in FIG. 1. A circuit generally designated 140 in FIG. 8 supplies electrical current to the two windings 60 and 66. The magnitude of the current flowing to a d.c. power supply 142 for supplying direct current to both coils 60 and 66 is controlled by a rheostat 144 connected to switch 132, the manual control knob 146 of which is located on housing 130 as shown in FIG. 1. The magnitude of the direct current to the electromagnet is measured by an ammeter 148, the display scale 150 of which is on housing 130 adjacent knob 146. The direction of the current flowing in both coils 60 and 66 is controlled by a field reversal double pole, double throw switch 152, the switch arm 154 of which is located on housing 130 as shown in FIG. 1. Switch 152 is in series with power supply 142 and meter 148. A field gradient switch 156 in series with switch 152 is provided for reversing the flow of current in one of the coils 60 or 66 to provide a field gradient for a purpose to be described. The switch arm 158 of switch 156 is located on housing 130 next to switch arm 154. The circuit 140 includes an arrangement of male 162 and female 164 electrical connectors for making electrical connection from the two conductors leading from switch 156 to the two windings 60 and 66, each of which has two conductors leading therefrom. The connectors 162 and 164 also provide electrical connection between power supply 142 and the strobe lamp 166. The connections designated "inside" and "outside" in FIG. 8 refer to the locations on each winding 60 and 66 at the radially innermost location and radially outermost location, respectively, physically on each winding. A control 168 for the strobe lamp 166 is activated by an on-off switch 170, the switch arm 172 of which is on housing 130 The frequency of light pulses is controlled by a potentiometer 174 connected to control 166, the manual control knob 176 of which is located on housing 130 adjacent a digital display 178 operated by control 168 for indicating the frequency of the strobe light pulses.

Figure 9:
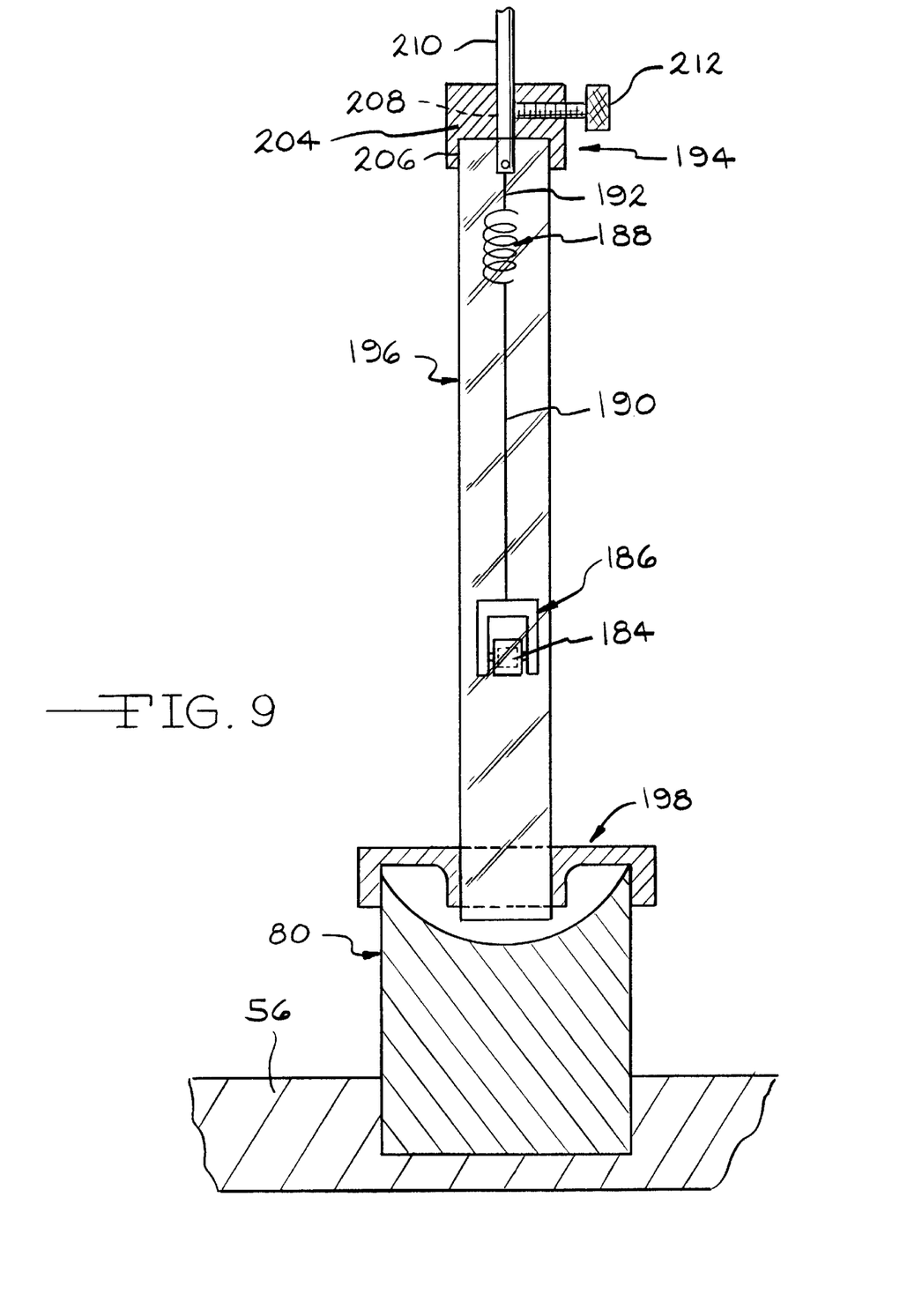
FIG. 9 is an elevational view illustrating an arrangement for use with the apparatus of FIGS. 1 and 2 for suspending a dipole in the magnetic field for measurement of translational force thereon.

FIGS. 9–12 illustrate another aspect of the present invention wherein a magnetic dipole is located in the magnetic field provided by coil assemblies 24 and 26 and is suspended by a spring scale to allow direct measurement of translational forces in the presence of a magnetic field gradient. As shown in FIG. 9, the permanent magnet means in this aspect of the present invention is a permanent magnet 184 rotatably carried in a gimbal assembly 186 which will be described in detail presently. The magnet 184 and assembly 186 are suspended from a spring 188, one end of which is connected by a line 190 to gimbal assembly 184 and the other end of which is connected by a line 192 to an adjustable spring support 194 mounted on the upper end of a clear plastic support tube 196 as viewed in FIG. 9, the lower end of which is supported on the body 80 via a cup-shaped member 198 Spring support 194 comprises a disk-shaped body 204 having a circular recess 206 on one face enabling it to fit snugly on the upper end of tube 196. A central bore or passage 208 in body 204 slidable receives a measuring rod 210 which extends a small distance into tube 196 for connection to line 192 and which extends outwardly from the opposite face of body 204. A set screw 212 series to hold rod 210 at a selected location for a purpose which will be described. The inner diameter of cup-shaped member 198 provides a snug fit on the upper end of body 80. The arrangement is provided for convenience in supporting the assembly of tube 196, magnet 184 and spring 188 without having to remove the air bearing, which is not used in this aspect of the present invention. If the air bearing including body 80 were not present or could be removed easily, then the cup-shaped member 198 simply would rest on the upper surface of coil form 56.

Figure 10:
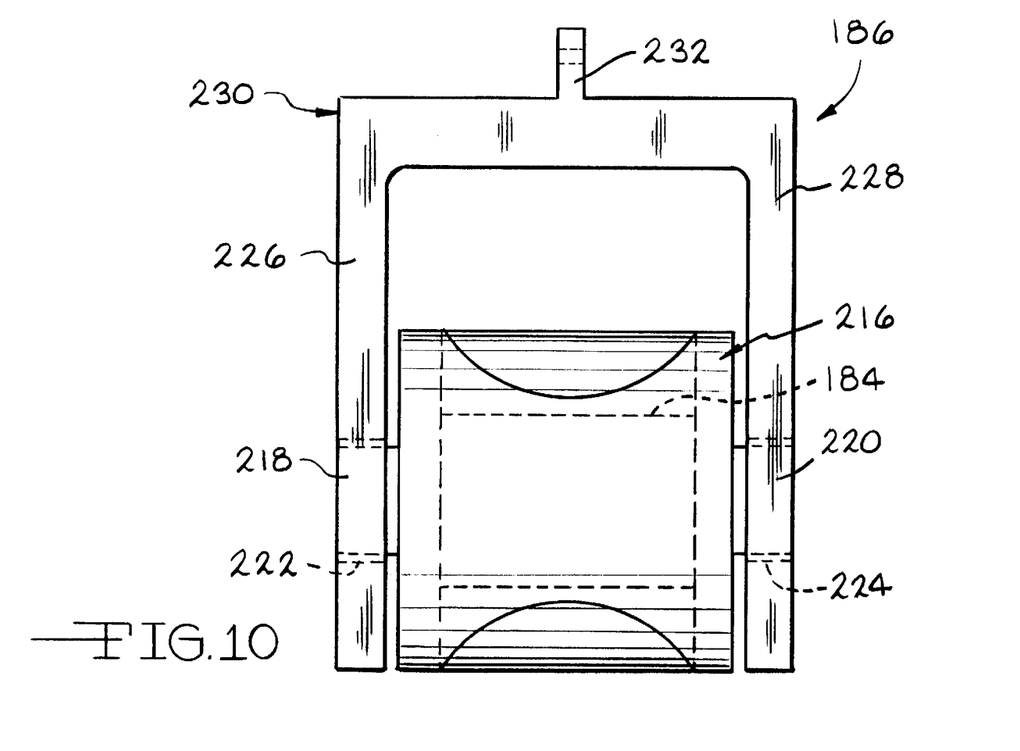
FIG. 10 is a side elevational view of the magnet-holding gimbal in the arrangement of FIG. 9.
Figure 11:
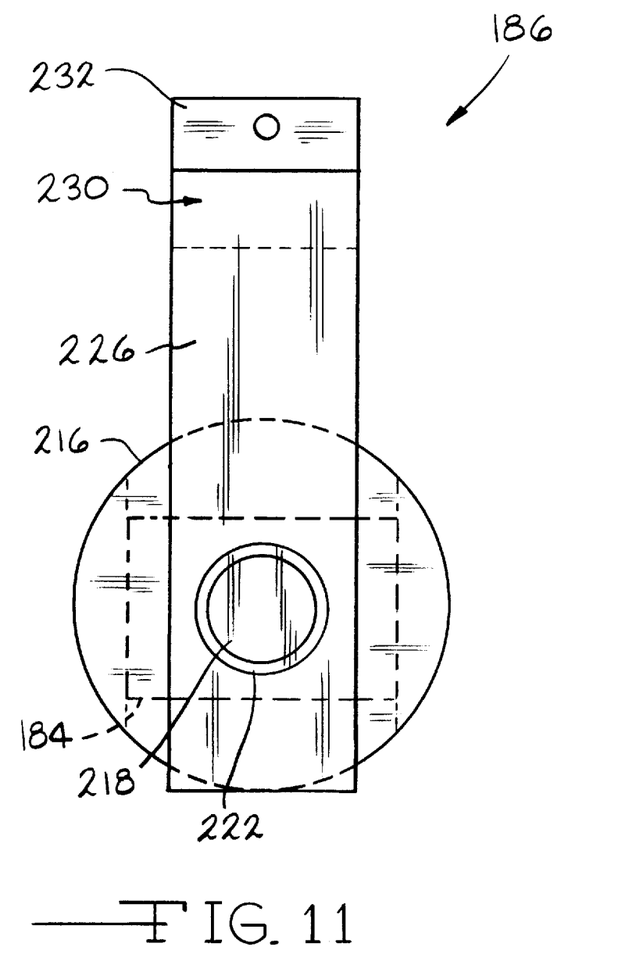
FIG. 11 is an end elevational view of the gimbal of FIG. 10.
Figure 12:
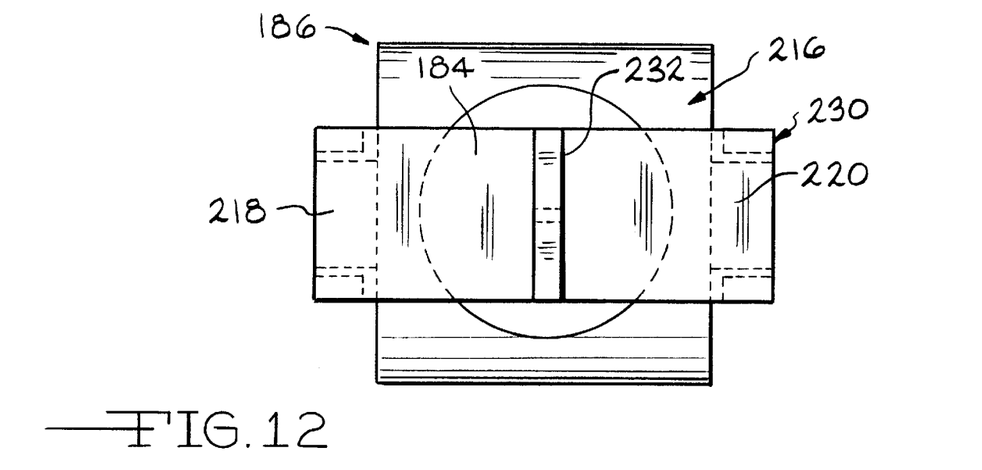
FIG. 12 is a top plan view thereof.

Referring now to FIGS. 10–12, magnet 184 is rectangular solid in shape and embedded in a cylindrical drum member 216 of plastic or other non-magnetic material. Drum 216 is provided with hubs 218 and 220 at opposite axial ends thereof which are rotatably received in openings 222 and 224, respectively, of depending arms 226 and 228 of a carriage member 230 of non-magnetic material. A fitting 232 on the upper body portion of carriage 230 is connected to line 190 extending from spring 188. As a result, magnet 184 is free to rotate about the axis of drum 216 of the gimbal assembly 186 under the influence of the magnetic field from coil assemblies 24 and 26 in a manner which will be described.

By way of example, in an illustrative teaching apparatus, spring 188 is a phosphor bronze wire having a diameter of 0.3048 mm coiled to an outer diameter of 5.7 mm and having a spring constant (or rate) of 0.001 Newtons/mm.

Figure 13:
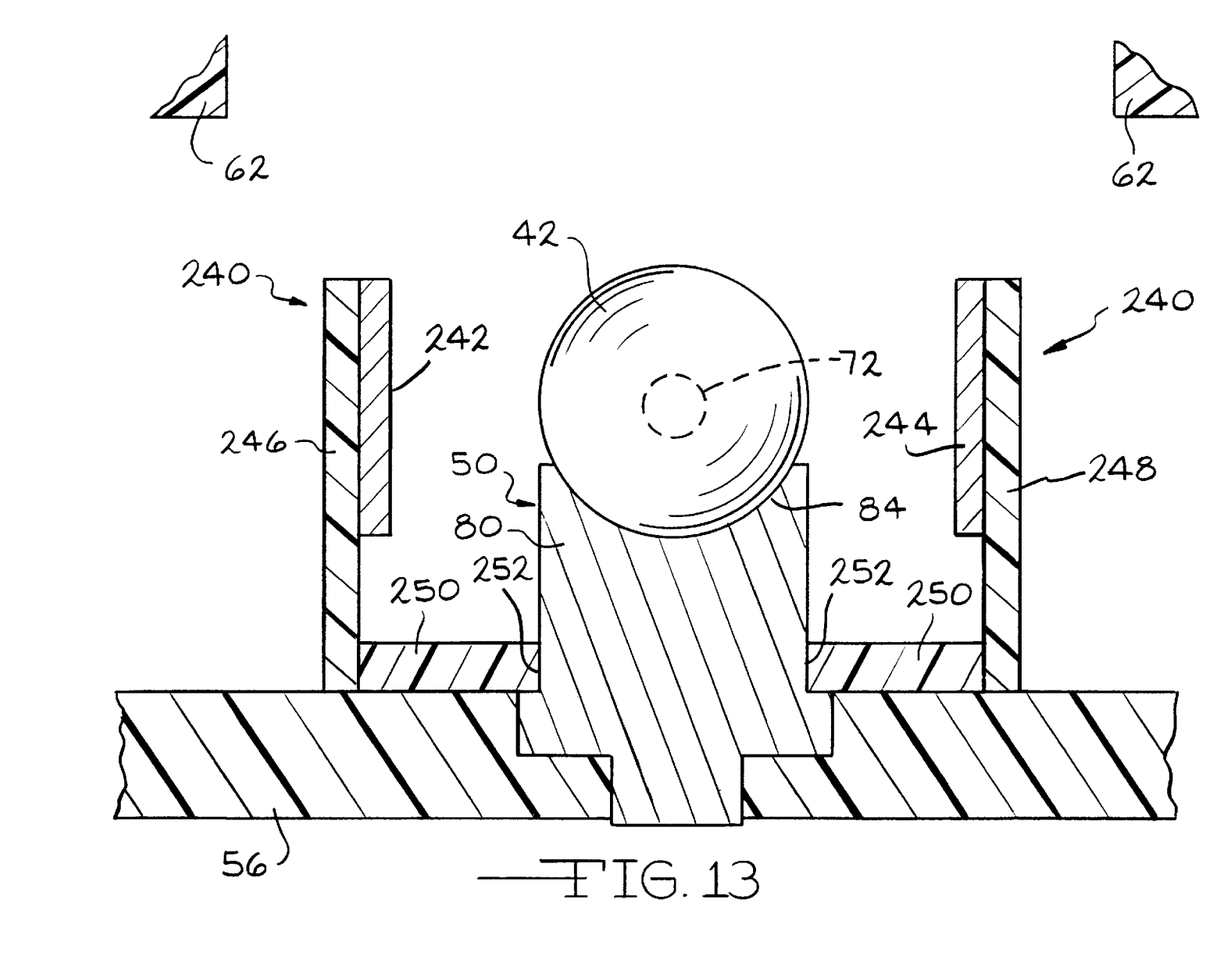
FIG. 13 is a fragmentary elevational view of the rotatable magnets used with the apparatus of FIGS. 1 and 2 for demonstrating nutation of a spinning sphere with an imbedded magnetic moment.

In the aspect of the invention illustrated in FIG. 13, a ratable magnet produces a uniform magnetic field in a direction substantially perpendicular to the direction of the field produced by coils 60 and 66 for demonstrating precession when sphere 42 is spinned and for demonstrating nutation when the magnet is rotated. The apparatus of the embodiment of FIG. 13 includes coils 60 and 66, spherical insulator 42 with embedded permanent magnet 72, and air bearing supporting means 50 of the embodiment of FIGS. 1 and 2. In addition, as shown in FIG. 13, there is provided magnet means generally designated 240 rotatably supported relative to the frame of apparatus 10 for rotation about an axis substantially parallel to the direction of the magnetic field produced by windings 60 and 66 for producing a uniform magnetic field in a direction substantially parallel to the planes of windings 60 and 66, i.e. in a horizontal direction as viewed in FIG. 13. As a result, upon spinning of sphere 42 precession is observed and upon rotation of magnet means 240 about the afore-mentioned axis, nutation is observed in a manner which will be described. In the apparatus shown, magnet means 240 comprises a pair of permanent magnets 242 and 244 carried by upright supports 246 and 248, respectively, joined to a base 250 rotatable mounted on body 80 of air bearing 50. Magnets 242 and 244 in the form of flat cylindrical disks with apertures in the centers are suitably attached to supports 246 and 248 by glue or like adhesive. Alternatively, magnets 242 and 244 can be set in recesses found in the surfaces of supports 246 and 248. Supports 246 and 248 together with base 250 can be rectangular in shape joined together by screws or like fasteners. Base 250 is provided with a central opening 252 of a diameter enabling it to be rotated on cylindrical body 80 while contacting the surface of coil form 56.

The operation of the teaching apparatus 10 of the present invention will be explained in conjunction with a description of various demonstrations and experiments carried out using the teaching apparatus. The apparatus 10 can be used to perform a series of experiments that study the interaction of magnetic fields with magnetic moments. These experiments fall into two categories: determination of a sphere's magnetic moment using three separate physics principles; and demonstration and measurement of the zero magnetic force on a magnetic dipole in a uniform magnetic field and of the net magnetic force on a magnetic dipole in a non-uniform magnetic field.

Turning to the first category, the magnitude of the magnetic dipole moment of the permanently magnetized disk 72 inside the plastic ball 42 is not known to the student. Three separate and distinct measurements, using different physics principles are made to determine the magnitude of this enclosed magnetic moment. The first measurement involves statically balancing an applied gravitational torque against the magnetic torque. A light weight rod 260 (with calibrated distance markings) is inserted into the hole 110 of the arrow indicator 44 on the sphere 42. The ball 42 is placed on the air bearing 50 with the rod 260 in the horizontal position as viewed in FIGS. 1 and 2. With the magnetic field at some value, i.e. some fixed current through the coils 60 and 66, set by manually adjusting knob 146, the ball 42 experiences a magnetic torque $=\mu \times B$ where $\mu$ is the magnetic moment and B the magnetic field. A small weight is suspended on the rod 260 to create a gravitation torque r $\times$ mg, where r is the distance from the center of the sphere 42 and mg is the equivalent weight at a distance r. The value of r is adjusted to make the gravitational torque equal to the magnetic torque and the system is then in static equilibrium. Since the magnetic field and the gravitational torque are known quantities, the magnetic dipole moment of the enclosed magnetized disk 72 can be determined. Alternatively, in a more accurate and more informative method, students carry out a series of measurements of the gravitational torque as a function of magnetic field and plot the results. The slope of this straight line plot yields the magnetic dipole moment.

The second method used the principles of simple harmonic motion to determine $\mu$. The ball 42 is placed on the air bearing 50 and the direction of $\mu$ is displaced a small angle from this vertical direction of the magnetic field. The ball 42 is then released. The system will then exhibit simple harmonic motion about the vertical direction. The differential equation of motion describing this motion is $$I \frac{d^2\theta}{dt^2} = \mu B \theta \text{ (for small } \theta\text{)}$$

where I is the moment of inertia about the center of the ball 42 and $\theta$ is the angular displacement of the magnetic moment from the direction of the magnetic field. The solution to this differential equation yields:

$$\omega = \left[ \frac{\mu B}{I} \right]^{1/2}$$

where $\omega$ is the angular frequency of oscillation in radians/second. Since I is easily measured from the weight and size of the ball 42 and $\omega$ can be measured using a stopwatch, the magnetic moment can be determined. Students will actually measure the period of oscillation T which is equal to $2\pi/\omega$ or $$T = \frac{1}{2\pi} \left[ \frac{I}{\mu B} \right]^{1/2}$$

Again, a more accurate and more interesting way to determine $\mu$ in these measurements is to plot $T^2$ vs $1/B$ for a series of magnetic field and period measurements.

$$T^2 = \left[ \frac{1 I}{4\pi^2 \mu} \right] \frac{1}{B}$$

The slope of this straight line graph can be used with the above equation to determine $\mu$.

The third method studies the precessional motion of a system which has both angular momentum and a collinear magnetic dipole moment. The ball 42 is spun on the air bearing 50 with the axis of both the magnetic moment and the angular velocity at some tilt angle with respect to the magnetic field. The angular velocity of rotation is measured with the calibrated strobe light from lamp 166 so that the magnitude of the angular momentum can be calculated. In particular, the light pulses from lamp 166 are directed onto indicator 44 and in particular on the stripes or indicia 112. The frequency of light pulses is adjusted by means of knob 176 until the indicia 112 visually appears to be stationary. Then the frequency of the light pulses equals the frequency of the movement of ball 42. The ball 42 exhibits precessional motion. The precessional period is sufficiently long that it can easily be measured with a stop watch. The precessional angular frequency $\Omega_p$ is related to the magnetic moment through the equation $$\Omega_p = \frac{\mu B}{\omega_s I}$$

where $\omega_s$ is the spin angular frequency and I is the moment of inertia. Here again the students can measure $\Omega_p$ as a function of B and $\omega_s$ to verify the above equations as well as to determine $\mu$.

In both demonstrations and laboratory use, students can be shown that this mechanical system with the ball 42 spinning, is a good classical model of how electrons or protons behave in a magnetic field. That is because these fundamental particles have both intrinsic angular momentum and magnetic moment.

Turning now to the second category of experiments, the embodiment of the teaching apparatus shown and described in FIGS. 9–12 is utilized. A common misconception held by most students taking introductory physics is that a magnetic dipole experiences a net force in a magnetic field. The experiments of the second category are designed to give the student hands-on experience with small magnets (magnetic dipoles) placed in various kinds of magnetic fields. First, the arrangement shown in FIG. 9 is calibrated. To do this, a series of known masses are attached to the gimbal assembly 186 containing magnet 184, and each mass will cause a given amount of extension of spring 188. After each extension, set screw 212 is loosened and rod 210 is manipulated to return gimbal assembly 186 to its original position before addition of the mass. The extent of movement of rod 210 is measured and this quantity is the amount of spring extension. Such calibration procedure allows any extension or contraction of spring 188 that occurs when the magnetic dipole, i.e. magnet 184, is placed in the magnetic field of coils 60 and 66 to be converted into a force measurement.

The spherical insulator 42 is removed from the apparatus 10, air bearing 50 is turned off and the combination including magnet 184, spring 188 and tube 196 is placed in the apparatus as shown and described in connection with FIG. 9. The arrangement is located in the apparatus 10 in such a way that the magnetic dipole, i.e. magnet 184, is located at the place where the center of the ball 42 would have been. This is the location of the maximum value of the magnetic field of coils 60 and 66 and also the place where the field has its maximum homogeneity. The extension of the spring 188 is noted with no current in the coils, no field. Then the magnetic field of coils 60 and 66 is turned on and brought up to its maximum value by adjusting knob 146. Although the magnetic dipole 184 may rotate, so that its magnetic moment aligns itself with the magnetic field, the spring 188 will not extend or compress. No net force is measured on the magnetic dipole 184.

The field is then reversed by operating switch 154. The magnetic dipole will also rotate 180 degrees to align itself with the magnetic field of coils 60 and 66, but no net force is registered by the spring 188.

Next, the direction of the current in one of the magnetic coils 60, 66 is reversed by operating switch 158. When the current is turned on the two coils 60, 66 will now produce opposing fields at the center, so the magnetic field there is zero. However, there is a field gradient in the vertical direction at the center. This field gradient does produce a net force on the magnetic moment given by:

$$F \mu \frac{dB}{dz}$$

where F is the force and $dB/dz$ is the magnetic field gradient is the z-direction, i.e. vertically as viewed in FIG. 9. Since $dB/dz$ can be calculated from the current and the geometry of the coils 60 and 66, and the force can be measured from the calibrated spring 188, the magnetic moment of the small disk 184 can also be determined. However, the main focus of these experiments is to show that only field gradients produce a net force on a magnetic dipole moment, not uniform fields The current in both coils 60, 66 can also be reversed, reversing the direction of the field gradient and thus the force.

Students can also measure the field gradient as a function of distance along the vertical z-axis by moving the magnet 184 to different locations along this axis, such as by changing the length of line 190, and measuring the force on the magnetic moment 184. These measurements can be compared to theoretical calculations of the gradient using a simple model of the electromagnet which assumes all the windings on one coil have the same diameter and same separation from the other coil. That is, the magnet is modeled as two single loops with a common axis. This yields a field gradient given by the expression $$\frac{dB}{dz} = \frac{3}{2} \mu_0 I \frac{R_2 z}{(R^2 + z^2)^{5/2}}$$

where $\mu = 1.36 \times 10^{-6}$ in SI units, R is the coil radius in meters, I is the current in amps and z is the distance from the center in meters.

The apparatus 10 can also be used to demonstrate some of the basic principles of nuclear magnetic resonance (NMR). FIG. 13 shows the apparatus with the addition of the set of permanent magnets 242,244 which produce a uniform magnetic field in the horizontal (or x-y) plane as viewed in FIG. 13. The magnets 242, 244 are mounted on a support system that can be manually rotated in the horizontal plane. Thus, in addition to the fixed magnetic filed in the z-direction provided by coils 60, 66, a second magnetic field $B_1$ can be applied in the x-y horizontal plane as viewed in FIG. 13. Instead of permanent magnets 242 and 244 electromagnets can be employed, in which case a slip ring arrangement is needed on base 250 for supplying current to the electromagnetic coils.

The spherical insulator 42 containing permanent magnet 72 is placed on the air bearing 50 and spun by hand to give the system comprising insulator 42, magnet 72 and indicator 44 angular momentum at some small angle θ. Then the current in the coils 60, 66 is increased slowly by manipulation knob 146 to create a 40 gauss fixed magnetic field in the z-direction, i.e. vertically as viewed in FIG. 13. The system will begin to precess, keeping this angle θ fixed. But now, if the horizontal field $B_1$ is manually rotated, by rotating the arrangement 240 about the vertical axis as viewed in FIG. 13, at the same precession frequency the angle θ will become time dependent. This is the demonstration of nutation, sometimes referred to as a "spin flip". This is the classical model of a spin transition in nuclear magnetic resonance. Observing an actual system undergoing a precession as well as nutation will greatly aid new students in understanding the fundamental ideas of NMR.

It is therefore apparent that the present invention accomplishes its intended objects. The teaching apparatus 10 can be used in a wide variety of demonstrations and experiments involving magnetic torque. The apparatus is relatively simple in construction so as to be relatively economical to manufacture, and the apparatus is effective and straightforward in operation.

While embodiments of the present invention have been described in detail, that is done for the purpose of illustration, not limitation.

What is claimed is:

1. Teaching apparatus for demonstrating the effect of a magnetic field on a magnetic moment comprising:
    a) a frame adapted to rest on the top of a table or like supporting surface disposed in a plane;
    b) electromagnet means supported by said frame for providing a uniform and constant magnetic field in a direction substantially perpendicular to said plane;
    c) means operatively associated with said electromagnet means for varying at least one parameter of said magnetic field;
    d) permanent magnet means for providing a magnetic moment; and
    e) means supported relative to said frame for movably supporting said permanent magnet means at a location to be influenced by said electromagnetic field so that a change in a parameter of said electromagnetic field causes a movement of said permanent magnet means thereby illustrating a magnetic phenomenon.

2. Apparatus according to claim 1, wherein said permanent magnet means comprises a sphere of non-magnetic and electrically non-conducting material having a permanent magnet at the center thereof.

3. Apparatus according to claim 2, wherein said permanent magnet comprises a disk of uniformly magnetized material.

4. Apparatus according to claim 3, wherein said material comprises neodymium iron boron.

5. Apparatus according to claim 2, further including indicator means on said sphere to facilitate observation of movement thereof.

6. Apparatus according to claim 5, further including strobe lamp means carried by said frame for illuminating said indicator with pulses of light during rotation of said sphere to investigate precessional motion thereof.

7. Apparatus according to claim 1, further including indicator means on said permanent magnet means to facilitate observation of movement thereof.

8. Apparatus according to claim 7, further including strobe lamp means carried by said frame for illuminating said indicator with pulses of light during movement of said permanent magnet meas to investigate motion phenomenon.

9. Apparatus according to claim 1, wherein said permanent magnet means comprises a non-magnetic spherical insulator having a magnetic dipole imbedded at the center thereof and wherein said means for supporting said permanent magnet means comprises gas-operated bearing and supporting means for providing an ultra-low frictional support for said spherical insulator thereby providing substantially no torque on said spherical insulator.

10. Apparatus according to claim 9, wherein said gas-operated bearing and supporting means comprises:
   a) means for defining a solid continuous concave surface having a degree of curvature substantially equal to the degree of curvature of the outer surface of said spherical insulator;
   b) means for defining an opening in said concave surface; and
   c) means for supplying gas under pressure to said opening so that gas flows over and along said concave surface to support said spherical insulator.

11. Apparatus according to claim 10, wherein said concave surface is semispherical and wherein said opening is located equidistant from the circular peripheral edge of said surface.

12. Apparatus according to claim 11, wherein an annular transition surface is provided at the junction between said opening and said semispherical surface to facilitate uniform flow of gas over and along said semispherical surface.

13. Apparatus according to claim 12, wherein said annular surface is disposed at an angle of about 82° with a plane including said opening.

14. Apparatus according to claim 10, wherein said means for supplying gas under pressure comprises a source of compressed air and conduit means connecting said same to said opening.

15. Apparatus according to claim 1, wherein said electromagnet means comprises a pair of annular coils disposed in planes spaced apart in said direction of said uniform electromagnetic field and having a common longitudinal axis and wherein said permanent magnet means is located adjacent said axis.

16. Apparatus according to claim 1, wherein said means for varying at least one parameter of said electromagnetic field comprises means for varying the magnitude of electrical current flowing to said electromagnet means.

17. Apparatus according to claim 1, wherein said means for varying at least one parameter of said electromagnetic field comprises means for changing the direction of the flow of electrical current to said electromagnet means in a manner creating a magnetic field gradient in said direction of said uniform electromagnetic field.

18. Apparatus according to claim 1, wherein said means for movably supporting said permanent magnet means comprises:
   a) spring means connected to said permanent magnet means; and
   b) means associated with said spring means for indicating the amount of translational movement of said permanent magnet means.

19. Apparatus according to claim 18, wherein said means for movably supporting said permanent magnet means places said permanent magnet means at an initial location where said electromagnetic field has a maximum value and maximum homogeneity.

20. Apparatus according to claim 18, wherein said means for varying at least one parameter of said electromagnetic field comprises means for varying the magnitude of electrical current flowing to said electromagnet means.

21. Apparatus according to claim 18, wherein said means for varying at least one parameter of said electromagnetic field comprises means for changing the direction of the flow of electrical current to said electromagnet means in a manner creating a field gradient in said direction of said uniform electromagnetic field.

22. Apparatus according to claim 18, further including gimbal means connected to said spring means and carrying said permanent magnet means in a manner permitting rotational movement of said permanent magnet means to align the magnetic moment thereof with said electromagnetic field.

23. Apparatus according to claim 1, wherein said permanent magnet means comprises a sphere of non-magnetic and electrically non-conducting material having a permanent magnet at the center thereof and having indicator means thereon to facilitate observation of movement thereof and wherein said apparatus further comprises magnet means rotatable supported relative to said frame for rotation about an axis substantially parallel to said direction of said electromagnetic field for producing a rotating uniform magnetic field in a direction substantially parallel to said plane whereby upon spinning of said sphere precession is observed and upon rotation of said magnet means nutation is observed.

* * * * *